United States Patent [19]
Komen

[11] 4,188,869
[45] Feb. 19, 1980

[54] DOOR FOR A STEAM PEELER

[75] Inventor: Cornelis Komen, Newtown, Ireland

[73] Assignee: Van Den Bergh Engineering Limited, Blackrock, Ireland

[21] Appl. No.: 877,644

[22] Filed: Feb. 14, 1978

[30] Foreign Application Priority Data

Feb. 23, 1977 [IE] Ireland .................................... 381/77

[51] Int. Cl.² ........................ A23N 7/00; E05F 15/02; F16J 13/02
[52] U.S. Cl. ...................................... 99/584; 99/483; 99/516; 220/244; 49/340
[58] Field of Search ................. 99/348, 410, 483, 516, 99/467, 540, 584; 220/211, 244, 222, 247, 314, 334, 337, 344; 126/369; 49/334, 338, 340

[56] References Cited
U.S. PATENT DOCUMENTS

| 2,591,601 | 4/1952 | Peters et al. | 99/348 |
| 2,639,601 | 5/1953 | Miller | 220/211 |
| 2,926,811 | 3/1960 | Faust | 220/244 |
| 2,941,236 | 6/1960 | Monroe et al. | 220/244 |
| 2,966,999 | 1/1961 | Swanson | 220/244 |
| 3,195,761 | 7/1965 | Coats | 220/211 |
| 3,410,446 | 11/1968 | Wilcox | 220/211 |
| 4,037,753 | 7/1977 | Brandau | 220/211 |
| 4,064,794 | 12/1977 | Kunz | 99/584 |
| 4,096,968 | 6/1978 | Treiber et al. | 220/244 |

Primary Examiner—Harvey C. Hornsby
Assistant Examiner—Timothy F. Simone
Attorney, Agent, or Firm—Ladas, Parry, Von Gehr, Goldsmith & Deschamps

[57] ABSTRACT

The invention relates to a device for opening and closing an inwardly opening door of a pressurized steam peeler which, in operation, is rotated on trunnions. The device consists basically of an operating arm and means for moving the arm all of which are mounted external of the vessel.

5 Claims, 3 Drawing Figures

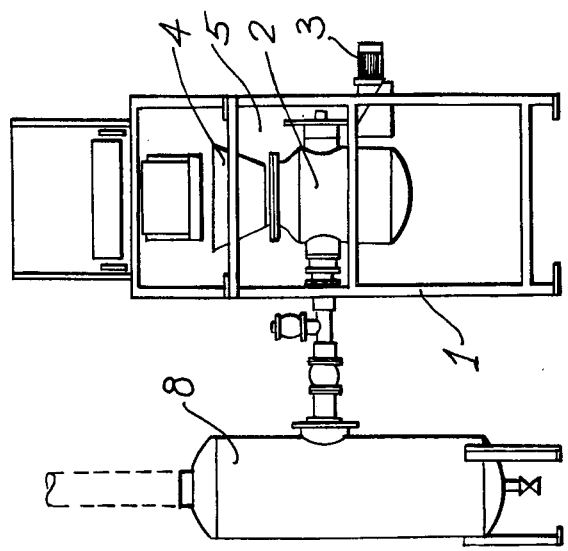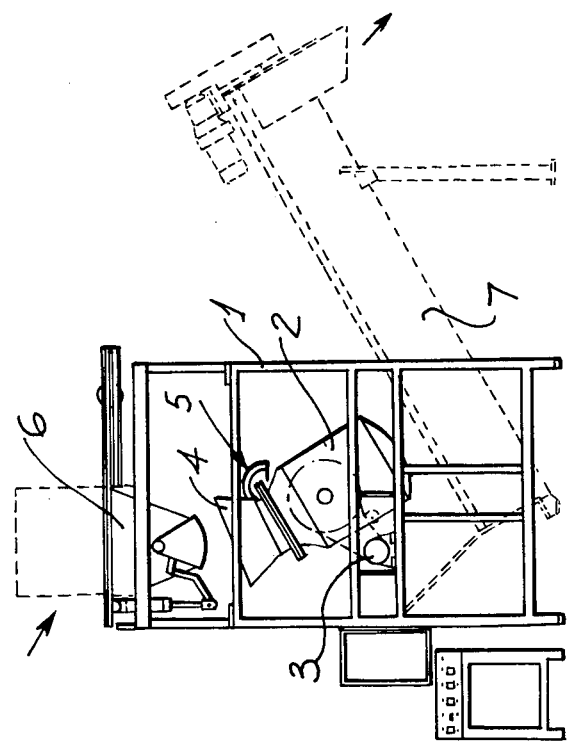

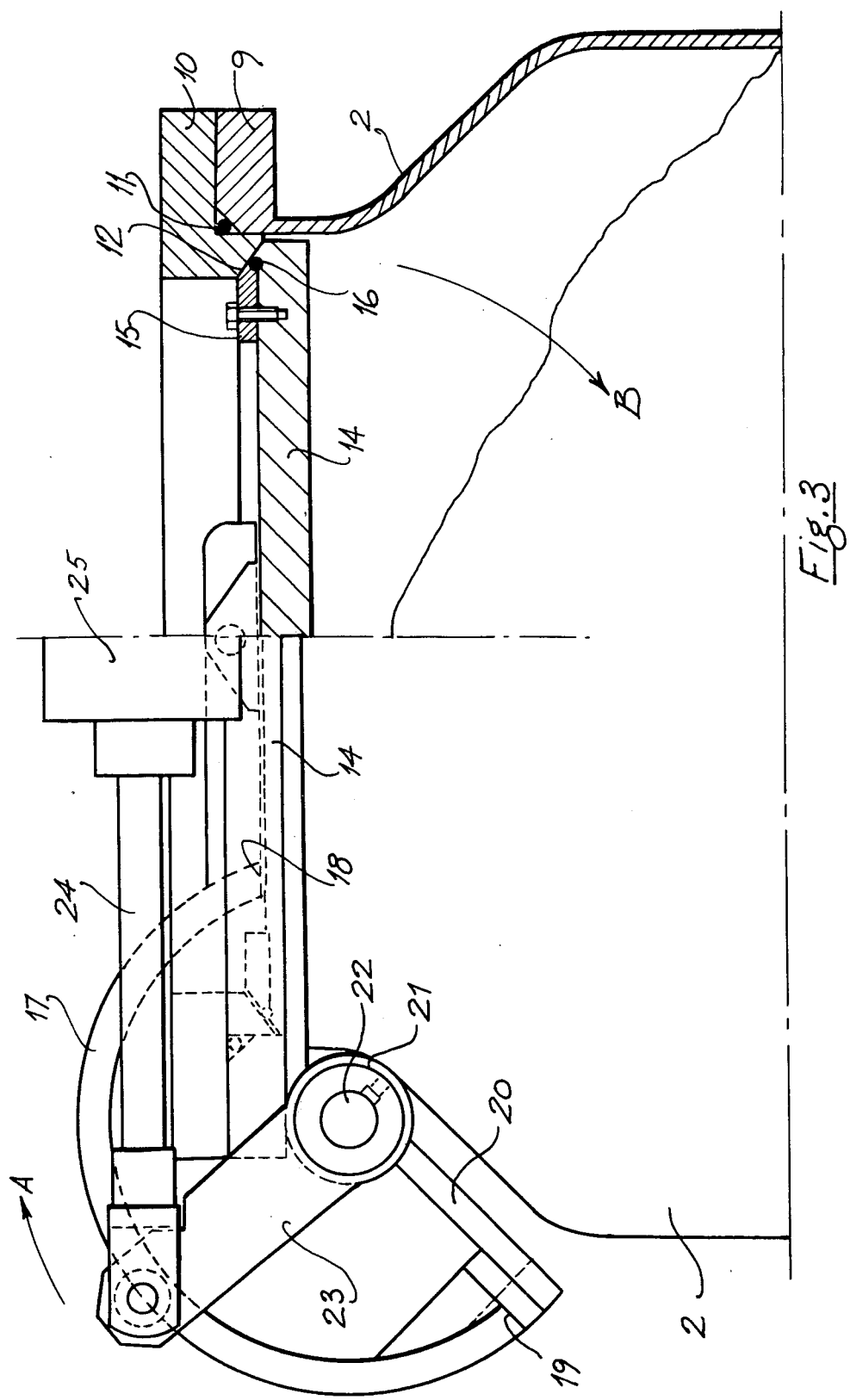

DOOR FOR A STEAM PEELER

BACKGROUND OF THE INVENTION

1. Introduction

The present invention relates to a construction of door for a steam peeler of the type comprising a pressurised steam vessel rotatably mounted on trunnions in a framework.

2. Field of the Invention

Such steam peelers are used for the peeling of vegetables, fruit and other products.

In such steam peeling apparatus it is essential to provide a sufficiently rigid door for the container which can be readily opened and closed. The doors for such pressurised containers are preferably inwardly opening. That is to say, such doors have a dimension larger than the opening that they are closing and are normally placed so as to open inwards into the container. In this way, in use, the pressure generated within the container causes the door to press all the more tightly on its seating thus improving it's sealing characteristics. Such doors are hereinafter referred to as interior doors.

Most constructions of steam peeler have interior doors which have some part of the opening or guiding mechanisms for the door within the container or steaming vessel as it is more usually called. The result of this is that there is a reduction firstly in the available capacity of the steaming vessel and secondly, consequent on the fact that part of the opening or the guidance mechanism for the door is within the steaming vessel there is wear and tear on the mechanism due to abrasion by the product. Additionally, there is a partial obstruction of the opening by the mechanism which reduces the effectiveness of the filling and emptying operations.

Objects

The present invention is directed towards providing an improved construction of interior door for a steam peeler. Another object of the invention is to provide a steam peeler in which all the available capacity of the steam vessel may be utilized.

A further object of the invention is to provide a door closing device for such an interior door which door closing device will not be subject to wear and tear due to abrasion by the product.

SUMMARY OF THE INVENTION

This invention provides in a steam peeler of the type comprising a pressurised steam vessel rotatably mounted on trunnions in a framework and having an interior door mounted within the vessel for closure of a combined product inlet and outlet, a door closing device comprising:
  a cranked arm pivotally mounted on the exterior of the vessel and connected to the door; and
  means external of the vessel for pivoting the arm to move the door within the vessel to open or close the product inlet and outlet.

The above and other objects and advantages of this invention will become apparent from the following detailed description in connection with the accompanying drawings.

BRIEF DESCRIPTION OF THE DRAWINGS

FIG. 1 is a side view of a steam peeler according to the present invention,

FIG. 2 is an end view, and

FIG. 3 is an enlarged, cut-away and partially sectional view of portion of an interior door for the steam peeler.

Referring to the drawings and initially to FIGS. 1 and 2 thereof, which illustrate a steam peeler there is provided a framework 1 on which is pivotally mounted by trunnions (not shown) a pressurised steaming vessel 2, movement of which is controlled by a motor 3. Mounted on the top of the steaming vessel 2 is a hopper 4 and an interior door, indicated generally by the reference numeral 5. The door 5 acts as closure for a combined product inlet and outlet. Above the hopper 4 is a weigh hopper 6 and below the steaming vessel 2 is a discharge conveyor 7 shown by interrupted lines in FIG. 1. An expansion tank 8 for exhaust steam is provided.

In use, product is fed from an elevator (not shown) into the weigh hopper 6. This weigh hopper 6 will continue to accept product until a preset weight of product is received, when the elevator is stopped. When the steaming vessel 2 is ready to accept product the weigh hopper 6 automatically discharges into the hopper 4 and through the door 5, the construction of which and operation of which will be described in more detail hereinafter. After a preset filling time the door 5 is closed the motor 3 is actuated and the steaming operation takes place while the vessel rotates on it's trunnions. When the requisite steam peeling operation is completed steam is exhausted into the tank 8, thus reducing the pressure in the steaming vessel, the door 5 opened and the steaming vessel 2 pivoted discharging the product onto the discharge conveyor 7. The product is then removed and the cycle repeated.

Referring to FIG. 3 the steaming pressure vessel 2 is provided with a peripheral lip 9 on which is mounted a removable wear ring 10. An O ring 11 is mounted between the peripheral lip 9 and ring 10. The ring 10 provides a bearing surface 12 for a door 14. The door closure 14 is provided with a hardened steel insert ring 15 for engagement with the bearing surface 12. An O ring 16 is mounted between the steel ring 15 and the door 14. A crank arm 17 of substantially arcuate shape is connected at 18 to the door and at 19 to a second pivot arm formed by a plate 20 which is mounted by a bearing 21 on a bar or shaft 22. The shaft 21 is connected by a first pivot arm 23 to a piston 24 of a pneumatic ram 25 mounted on one side of the steaming vessel 2.

In operation retraction of the piston 24, from the position illustrated in FIG. 3, into the pneumatic ram 25 will cause the first pivot arm 23 to pivot about the axis of the shaft 22 in the direction of the arrow A which in turn will cause the door 14 to pivot about the axis of the shaft 22 in the direction of the arrow B into the interior of the steaming vessel 2. Thus, the door moves within the vessel 2 along a path which is curved about the axis of the shaft 22, first moving almost directly downwards from the product inlet and outlet and subsequently moving away from beneath the product inlet and outlet towards a side wall of the vessel.

Thus the door 14 does not impede the entry of product into or the discharge of product out of the vessel.

Needless to say a hydraulic ram may be used instead of a pneumatic ram.

The term "trunnions" used in this Specification is intended to cover the use of all forms of bearings.

What we claim is:

1. In a steam peeler of the type comprising a pressurized steam vessel rotatably mounted on trunnions in a framework and having a rim which defines an opening forming a combined product inlet and outlet of the vessel and also having an interior door mounted within the vessel for closure of the combined product inlet and outlet, a door closing device comprising:

first support means mounted externally of the vessel and defining a first axis which extends externally of the vessel and adjacent the rim thereof;

second support means mounted on said first means to rotate with respect to the vessel about said first axis;

a rigid pivot arm which has first and second opposite ends and is connected rigidly at its first end to said second support means and extends substantially radially of said first axis;

a rigid arcuate cranked arm which has first and second opposite ends and is connected rigidly at its first end to the second end of the pivot arm, is curved from its first end to its second end through an angle of at least 90° about an axis which substantially coincides with said first axis, passing with clearance about the rim of the vessel, and is connected rigidly at its second end to the door, whereby upon rotation of the second support means about said first axis the door is moved within the vessel towards or away from the product inlet and outlet along a path which is curved about said first axis; and drive means external of the vessel and connected to rotate the second support means about said first axis and thereby move the door within the vessel along said path to open or close the product inlet and outlet.

2. A door closing device as claimed in claim 1, wherein said crank arm is curved from its first end to its second end through an angle of substantially 180°.

3. A door closing device as claimed in claim 1, wherein said dirve means comprise a fluid operated ram including a piston and cylinder.

4. A door closing device as claimed in claim 3, wherein the ram is a pneumatically operated ram.

5. A door closing device as claimed in claim 3, wherein the ram is an hydraulically operated ram.

* * * * *